United States Patent
Gommel et al.

(10) Patent No.: US 8,337,699 B2
(45) Date of Patent: Dec. 25, 2012

(54) REACTOR INLET

(75) Inventors: Axel Gommel, Ravensburg (DE); Dieter Efinger, Kumhausen (DE); Werner Gessler, Ravensburg (DE); Ronald Mulder, Alkmaar (NL)

(73) Assignees: Voith Patent GmbH, Heidenheim (DE); Aquatyx Wassertechnik GmbH, Ravensburg (DE)

( * ) Notice: Subject to any disclaimer, the term of this patent is extended or adjusted under 35 U.S.C. 154(b) by 0 days.

(21) Appl. No.: 13/204,258

(22) Filed: Aug. 5, 2011

(65) Prior Publication Data

US 2012/0031835 A1    Feb. 9, 2012

Related U.S. Application Data

(63) Continuation of application No. PCT/EP2009/066809, filed on Dec. 10, 2009.

(30) Foreign Application Priority Data

Feb. 9, 2009 (DE) .................. 10 2009 008 044

(51) Int. Cl.
C02F 3/28 (2006.01)
(52) U.S. Cl. ...................... 210/603; 210/260
(58) Field of Classification Search .......... 210/603, 210/259, 260
See application file for complete search history.

(56) References Cited

U.S. PATENT DOCUMENTS

| 4,780,198 | A | 10/1988 | Crawford et al. |
| 5,543,141 | A * | 8/1996 | Braford-Goldberg et al. ............ 424/85.2 |
| 2009/0223890 | A1 | 9/2009 | Frankin et al. |
| 2010/0000940 | A1 | 1/2010 | Menke et al. |

FOREIGN PATENT DOCUMENTS

| DE | 102004021022 B3 | 10/2005 |
| DE | 102006020709 A1 | 11/2007 |
| EP | 0170332 A1 | 2/1986 |
| EP | 0493727 A1 | 7/1992 |
| EP | 1071636 B1 | 1/2002 |

OTHER PUBLICATIONS

International Search Report dated Apr. 14, 2010 for PCT/EP2009/066809 (6 pages).

* cited by examiner

*Primary Examiner* — Fred Prince
(74) *Attorney, Agent, or Firm* — Taylor IP, P.C.

(57) ABSTRACT

The invention relates to a reactor for anaerobically purifying waste water, especially waste water from the paper industry, comprising a reactor vessel, several inlets arranged in the bottom region of the reactor vessel to feed waste water to be purified into the reactor, at least one outlet for discharging purified water, and at least one sediment drain. One or more inlets are fed by a supply pipe, and several supply pipes are fed by a collecting supply pipe. In order to ensure that waste water to be purified is fed as regularly as possible at the bottom of the reactor vessel, at least the majority of the supply pipes of a collecting supply pipe supply waste water to be purified to a maximum of 10 inlets, and at least the majority of said supply pipes each have a control valve.

18 Claims, 2 Drawing Sheets

REACTOR INLET

CROSS REFERENCE TO RELATED APPLICATIONS

This is a continuation of PCT application No. PCT/EP2009/066809, entitled "Reactor Inlet", filed Dec. 10, 2009, which is incorporated herein by reference.

BACKGROUND OF THE INVENTION

1. Field of the Invention

The invention relates to a reactor for anaerobically purifying waste water, especially waste water from the paper industry, comprising a reactor vessel, several inlets arranged in the bottom region of the reactor vessel to feed waste water to be purified into the reactor, at least one outlet for discharging purified water, and at least one sediment drain, whereby one or more inlets are fed by one supply pipe and several supply pipes are fed by one collecting supply pipe.

The invention moreover relates to a method for anaerobically purifying waste water, especially waste water from the paper industry, comprising a reactor vessel, several inlets arranged in the bottom region of the reactor vessel to feed waste water to be purified into the reactor, at least one outlet for discharging purified water, and at least one sediment drain, whereby one or more inlets are fed by one supply pipe and several supply pipes are fed by one collecting supply pipe.

2. Description of the Related Art

A multitude of mechanical, chemical and biological methods and corresponding reactors are known for purification of waste water. In biological waste water purification, the waste water to be purified is brought into contact with aerobic or anaerobic micro-organisms which, in the case of aerobic micro-organisms decompose organic contaminants contained in the waste water predominantly to carbon dioxide, biomass and water, and in the case of anaerobic micro-organisms mainly to carbon dioxide and methane and only in small part to biomass.

In recent times the biological waste water purification methods are hereby carried out increasingly with anaerobic micro-organisms, since with the anaerobic waste water purification oxygen does not have to be fed with high energy expenditure into the bioreactor; energy-rich biogas is produced during purification which can subsequently be utilized for generating of energy; and substantially lower volumes of excess sludge are produced.

Depending on the type and form of the utilized biomass, the reactors for anaerobic waste water purification are categorized into contact sludge reactors, UASA-reactors, EGSB-reactors, fixed bed reactors and fluidized bed reactors.

Whereas the micro-organisms in fixed bed reactors adhere to stationary carrier materials and the micro-organisms in fluidized bed reactors adhere to freely moving, small carrier material, the micro-organisms in UASB and EGSB reactors are utilized in the form of so-called pellets. In contrast to UASB (upflow anaerobic sludge bed) reactors, EGSB (expanded granular sludge bed) reactors are higher and at same volume have a substantially smaller base area.

In the case of UASB and EGSB reactors, waste water which is to be purified, or a mixture of waste water which is to be purified and already purified waste water from the outlet of the anaerobic reactor is fed continuously to the reactor through an inlet which is arranged in the lower region of the reactor and is directed through a micro-organism pellet-containing sludge bed which is located above the inlet.

During decomposition of the organic compounds from the waste water, the micro-organisms form in particular methane and carbon dioxide containing gas (which is also referred to as biogas) which partially adheres to the micro-organism pellets in the form of small bubbles and which partially rises to the top in the reactor in the form of free gas bubbles. Because of the added gas bubbles the specific weight of the pellets decreases, which is the reason that the pellets rise to the top in the reactor. In order to separate the formed biogas and the rising pellets from the water, separators are arranged in the center and/or upper part of the reactor, mostly in the embodiment of gas hoods under the top of which biogas accumulates, forming gas cushions. Purified water, relieved of gas and micro-organism pellets rises to the top in the reactor and is drawn off at the upper end of the reactor through overflows. Methods and associated reactors are described for example from EP 0170 332 A and EP 1 071 636 B.

For the previously described methods uniform distribution of the waste water added to the reactor through the inlet across the reactor cross section is particularly important in order to achieve good blending of the sludge pellets which are present in the reactor, of the water which is present in the reactor and of the added waste water. In order to meet these requirements, a multitude of reactors, equipped with appropriate inlet distributors have already been suggested.

These have a multitude of inlets in the region of the reactor chamber through which the waste water which is to be purified is to be distributed.

Especially with waste water having high lime content, such as waste water from the paper industry, precipitation and sediment deposits occur frequently. These settle on the bottom of the reactor vessel and thereby increase the flow resistance at the discharge openings of the inlets. The result is that a greater volume flows from other inlets of the inlet distributor.

This may result in that more than 75% of the inlets are inactive without this being recognizable from the outside. Because of the non-uniform supply of waste water associated with this, the efficiency of the waste water treatment can be substantially lowered.

What is needed in the art is to ensure an as uniform as possible infeed of waste water to be purified at the bottom of the reactor vessel. In the following the term "pellets" is to be understood to be in particular granulated bio-sludge.

SUMMARY OF THE INVENTION

The present invention provides that at least the majority of the supply pipes of a collecting supply pipe supplies a maximum of 10 inlets with waste water which is to be purified and whereby at least the majority of said supply pipes each respectively is equipped with a control valve.

By minimizing the inlets allocated to the supply pipes the distribution of waste water that is to be purified can be better controlled across the cross section of the reactor vessel and can thereby also be made more uniform.

This is also still possible even when individual inlets are partially or totally covered by sediment deposits.

Moreover—because of the low number or inlets in a supply pipe—when only one or few inlets are obstructed, there is a strong increase of flow in the other unobstructed inlets of this supply pipe, thereby counteracting the obstruction.

With the higher number of supply pipes a more uniform distribution across the bottom of the reactor vessel of the supply of waste water which is to be purified can be ensured, even when inlets are obstructed.

In the event of an obstruction or respectively uneven flow this can be recognized in that these inlets become cold.

Depending on the construction and size of the reactors, as well as the type of waste water it can be advantageous—even when considering the higher expenditure for the increased number of supply pipes and control valves—if the majority of the supply pipes of a collecting supply pipe supply a maximum of 6, preferably a maximum of 3 or even only one inlet with waste water to be purified.

To comprehensively influence the supply of waste water to be purified, all supply pipes should be equipped with a control valve.

Moreover it is advantageous if at least a majority of the inlets, preferably all inlets protrude beyond the bottom of the reactor vessel. This can prevent that sediments settling on the bottom of the reactor vessel even cover the inlets, or at least prevent that they cover them too quickly.

Only a definitive distance to the bottom of the reactor is hereby crucial, so that the inlets can be brought through the bottom or through the side into the reactor vessel.

It is moreover advantageous when at least the majority of the supply pipes, preferably all supply pipes are routed out of the reactor vessel. Since generally also the inlet distributor is located outside the reactor vessel this can on the one hand easily be realized, and on the other hand allows accessibility to measuring and control devices in as far as they are installed or arranged in the section of the supply pipe which is located outside the reactor vessel.

In addition to the control valves at least a majority of supply pipes, preferably all supply pipes should be equipped with a flow meter which would facilitate relatively easy determination if any or how many inlets of the relevant supply pipe are obstructed. The supply distribution across the cross section of the reactor can then be more effectively controlled.

To be able to loosen and remove the sediment more easily from the reactor bottom it is advantageous if at least one inlet, preferably all inlets of at least one supply pipe is directed to a sediment drain.

Moreover, in the interest of a uniform distribution of the added volume of waste water, all inlets should also preferably be distributed uniformly across the bottom of the reactor vessel.

In regard to the constructive embodiment of the reactor vessel it was shown to be advantageous if the reactor vessel has at least one downward tapering funnel and if the sediment drain is located at the lower end of the funnel. The reactor, as well as the funnel can have a round or angular cross section.

The funnel-shaped reactor bottom, especially in the form of a downward tapering single cone or double cone ensures that solids having a high specific weight descending from the upper section of the reactor can be discharged from there.

Accumulation of sediments in the area of the inlets which would lead to formation of dead spaces and to a reduction of the effective reactor cross section could hereby be avoided.

Here, the reactor bottom may also be formed by several funnels with sediment drainage.

Moreover, at least one central supply pipe for the addition of liquid should feed into the bottom end of the funnel, whereby the furnished liquid can consist of waste water to be purified, purified waste water or a mixture thereof. The pellets can be reactivated and/or the sediment detachment and discharge can be assisted through this liquid.

In order to adapt the inlets to the prevailing conditions in the reactor and in order to avoid blockages, as well as to assist the sediment detachment or discharge it is also advantageous if at least some, preferably all inlets are changeable in regard to their location and/or orientation.

In regard to the inventive method it is important that several supply pipes are each equipped with a control valve and that at least individual control valves are from time to time opened to a different level. The flow volume in the supply pipes is thereby adjusted to the requirements and if needed, lowered to zero.

In the interest of comprehensive controllability the waste water volume flow should therefore be controlled in all supply pipes via control valves.

In order to be able to better homogenize the distribution of the waste water to be fed into the reactor vessel, the flow rate on some, preferably on all supply pipes should be measured and the control valves controlled depending upon the flow rate in the supply pipes.

Moreover it is advantageous for the process control if the extent of the sediment deposit on the bottom of the reactor vessel and/or the removed sediment volume is measured.

In this manner not only the extent of the sediment deposit, but also distribution thereof may be determined.

This also permits a targeted sediment removal.

If, for example, sediments in a certain section of the reactor bottom are to be loosened or removed, then only those inlets are supplied through the control valves—intensified or exclusively—with liquid, especially waste water to be purified which are arranged in that section of the bottom which is to be flushed clean and/or which are directed onto a sediment drain in that section.

Independent of the sediment removal in a certain section it can also be advantageous for general support of the sediment discharge if only those inlets are intensified or exclusively supplied with liquid, especially waste water to be purified through the control valves which are directed onto one or several sediment drains.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
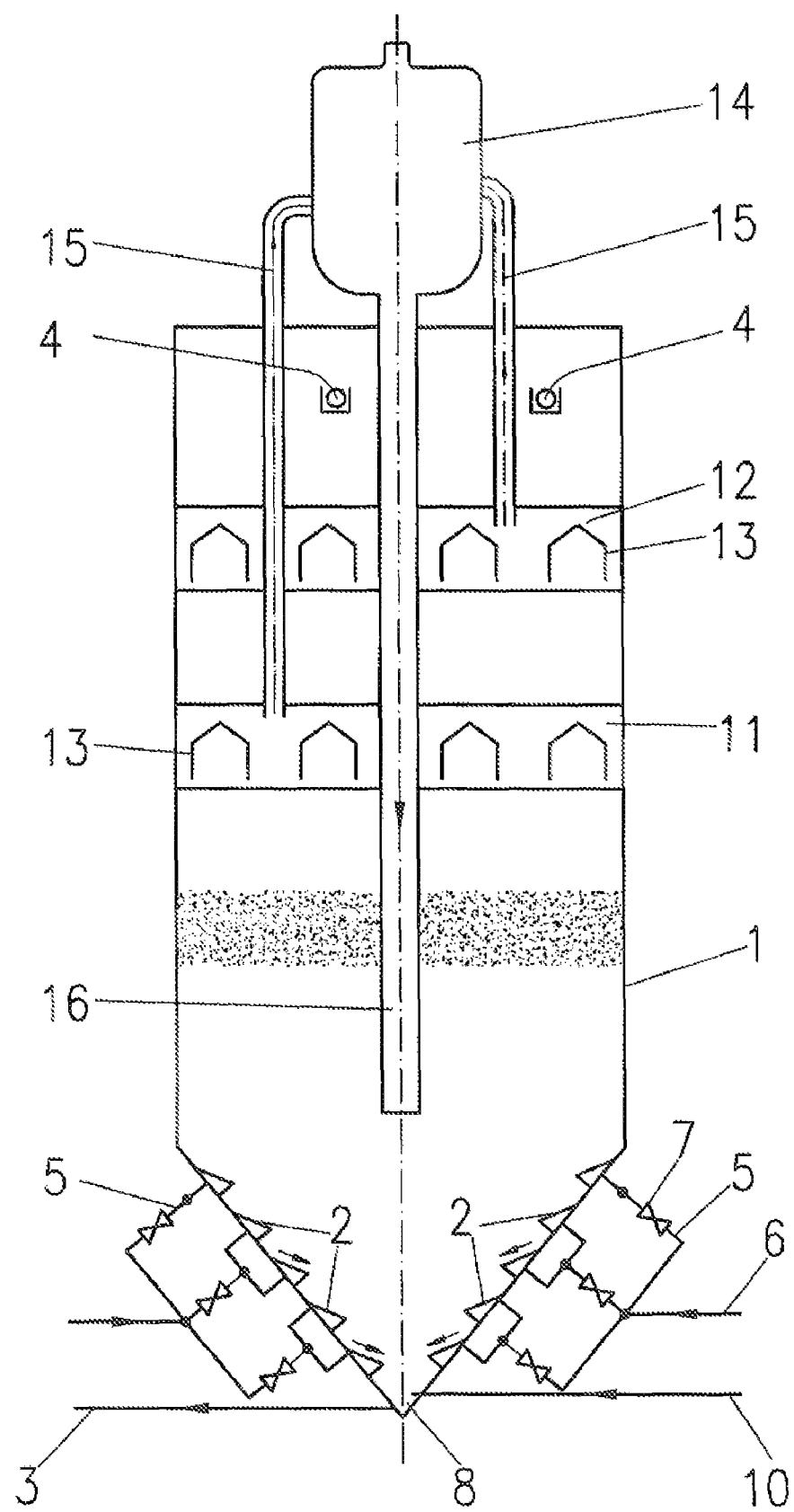
FIG. 1 is a schematic longitudinal section through a reactor.

The bioreactor illustrated in FIG. 1 comprises a reactor vessel 1 which is cylindrical in its center and upper region and which tapers conically downward in its lower region. The supply distribution system to feed the waste water to be purified is located in the lower region, in other words in the funnel of the reactor.

Two separators 11, 12 which each are equipped with several gas hoods 13 are located in the center and upper reactor vessel 1. In practical operation each of the separators 11, 12 consists of several layers of gas hoods 13; for reasons of simplification however, only one layer of gas hoods 13 per separator 11,12 is depicted in current FIG. 1.

Drains 4 are located above upper separator 12, each in the embodiment of an overflow through which the purified water is drawn from the reactor.

A gas separation device 14 is arranged on the reactor which is connected via pipes 15 with the two separators 11, 12. In addition, a drain pipe 16 leads from the bottom of gas separation device 14 into the lower region of reactor vessel 1.

Moreover, a sediment drain 3, as well as a central supply pipe 10 are located in the lower region of reactor vessel 1, more precisely in the lower region of the funnel, whereby solids or respectively a suspension consisting of solids and liquid can be drawn from reactor vessel 1 via sediment drain 3, and liquid for flushing of lower reactor vessel region 1 can be furnished through central supply pipe 10.

The inlet distribution system is formed by a multitude of inlets 2 which are arranged uniformly on bottom 8 of reactor vessel 1—in this example on the inside wall of the funnel.

The water to be purified is fed into reactor vessel 1 via these inlets 2. Here, only a few, specifically no more than five inlets 2 are supplied with the waste water by a common supply pipe 5. Each supply pipe 5 is connected through one control valve 7 each with a collecting supply pipe 6 which is allocated to several supply pipes 5.

In this way an obstruction of an inlet 2 affects the other few inlets 2 of supply pipe 5 more significantly, so that the remaining open inlets 2 experience a stronger flow rate, thus accordingly counteracting a sediment deposit on respective inlet 2.

Moreover, blocked inlets 2 are freed through the pressure increase in supply pipe 5, whereby the pressure can also be raised simply through closing other supply pipes.

Moreover, due to the high number of supply pipes 5 which can be controlled through control valves 7, the distribution of the added waste water on bottom 8 of reactor vessel 1 can be controlled much more precisely.

Inlets 2 allocated to a supply pipe 5 can be arranged adjacent to each other and/or on top of each other in reactor vessel 1.

During operation of the reactor, waste water to be purified is fed into reactor vessel 1 through inlets 2, whereby homogeneous mixing occurs between the added waste water and the medium in the reactor which consists partially of purified waste water, micro-organism pellets (indicated in FIG. 1 by small dots) and small gas bubbles.

The furnished waste water flows from inlets 2 slowly upward in reactor vessel 1 until it reaches the fermentation zone containing the micro-organism containing sludge pellets. The micro-organisms contained in the pellets decompose the organic contaminates contained in the waste water, predominantly to methane and carbon dioxide gas. Due to the produced gas, gas bubbles occur, the larger of which detach themselves from the pellets and bubble through the medium, whereas the smaller gas bubbles remain adhered to the sludge pellets. The pellets on which small gas bubbles adhere and which, therefore, have a lower specific weight than the other pellets and the water, rise in reactor vessel 1 until they reach the lower separator 11.

The free gas bubbles collect in gas hoods 13 and form a gas cushion below the top of gas hoods 13.

The gas accumulated in gas hoods 13, as well as a small amount of carried along pellets and water are discharged for example from gas hoods 13 through an opening which is not illustrated and which is located on the face side of gas hoods 13, and is fed into gas separation device 14 through pipe 15.

The water, the rising micro-organism pellets and the gas bubbles which were not already separated in lower separator 11, rise further in reactor vessel 1 to the upper separator 12. Due to the decrease of the hydrostatic pressure between lower separator 11 and upper separator 12, the remaining small gas bubbles detach form the micro-organism pellets which got into upper separator 12, so that the specific weight of the pellets increases again and the pellets sink downward.

The remaining gas bubbles are captured in gas hoods 13 of upper separator 12 and are again transferred into a gas collecting pipe on the face sides of individual gas hoods 13, from where the gas is fed into the gas separation device 14 via pipe 15.

The now purified water rises from upper separator 12 further upwards, until it is drawn by the overflows from reactor vessel 1 and is discharged through an outlet pipe.

In gas separation device 14 the gas separates from the remaining water and the micro-organism pellets, whereby the suspension consisting of pellets and the waste water recirculates through the drain pipe 16 into reactor vessel 1. The outlet opening of drain pipe 16 feeds into the lower section of reactor vessel 1 where the re-circulated suspension of pellets and waste water is mixed with the waste water fed to reactor 1 through inlets 2, after which the cycle begins again.

Depending on the origin of the waste water furnished to reactor 1 through inlets 2, the waste water has greater or lesser solids content. Waste water from the paper industry for example contains significant concentrations of solid filler materials and lime. After the solids-containing waste water has left inlets 2 it rises upward into the cylindrical reactor vessel section. The portion of solids contained in the waste water which exceeds a minimum of specific density, descends already after leaving inlets 2 into the downward tapering funnel where it accumulates.

Moreover, a portion of the calcium dissolved in the waste water precipitates on the sludge pellets after the waste water has risen in the sludge bed zone. Thus, a portion of the sludge pellets exceeds a critical specific density and therefore descends from the sludge bed and also accumulates in the funnel.

Inlets 2 are arranged and aligned to sediment drain 3 so that the pellets which descend downward from the top do not settle on inlets 2, but glide off the outside surface of inlets 2 and also accumulate in the tip of the funnel.

The sediment accumulating in the tip of reactor vessel 1 can be removed from the reactor continuously, or in batches as required, through sediment drain 3.

Moreover, liquid can also be fed through central supply pipe 10 continuously or in batches, as required, into lower section 2 of the reactor vessel. The liquid fed into the reactor through this central supply pipe 10 can be waste water to be purified, re-circulated waste water from the reactor, fresh water or a mixture thereof.

Figure 2:
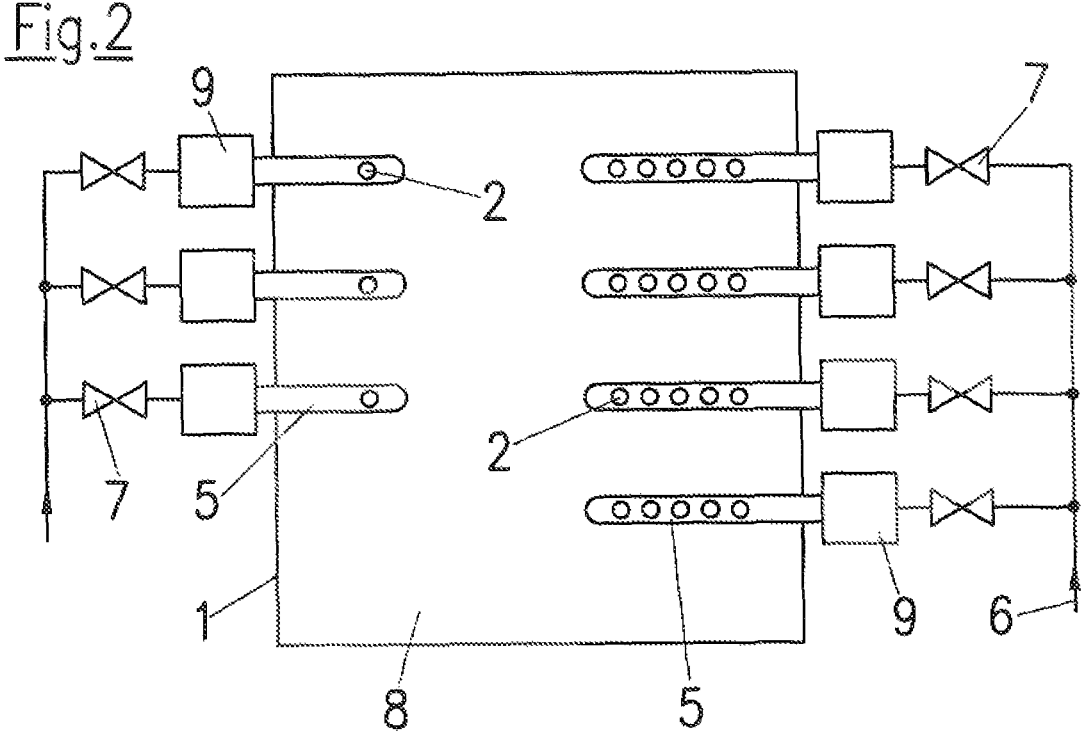
FIGS. 2 and 3 are various supply distribution systems on bottom 8 of the reactor.

In contrast, the reactor depicted in FIG. 2 has a square cross section. As can be seen in the top view of bottom 8 of the reactor, several supply pipes 5 feed into reactor vessel 1, laterally from the reactor wall.

Each supply pipe 5 has a maximum of five inlets 2, which here are directed into the upper section of reactor vessel 1. This is to assist mixing of the waste water furnished through inlets 2, with the medium in reactor vessel 1.

In order to impede covering of inlets 2 with sediment, the inlets are arranged several centimeters above bottom 8 of the reactor.

Located outside reactor vessel 1 is also flow meter 9 which, in this example, is allocated to each supply pipe 5, as well as a control valve to influence the flow rate in supply line 5.

In place of a stationary flow meter 9, mobile units can also be utilized.

In any event, locating the control and meter devices 7, 9 outside of reactor vessel 1 makes them less susceptible to failure than inside the reactor in the sometimes aggressive atmosphere. Assembly and maintenance are hereby also simplified.

Through flow meters 9 it can easily be determined if individual or several inlets 2 of a supply pipe 5 are compromised.

In the case of a blockage for example a momentary pressure increase in the respective supply pipe 5 can free blocked inlets 2. Here, the pressure increase can also occur through closing other supply pipes 5.

On the assumption that all inlets 2 of this supply pipe 5 are compromised, the pressure in supply pipe 5 can also be increased in general.

Figure 3:
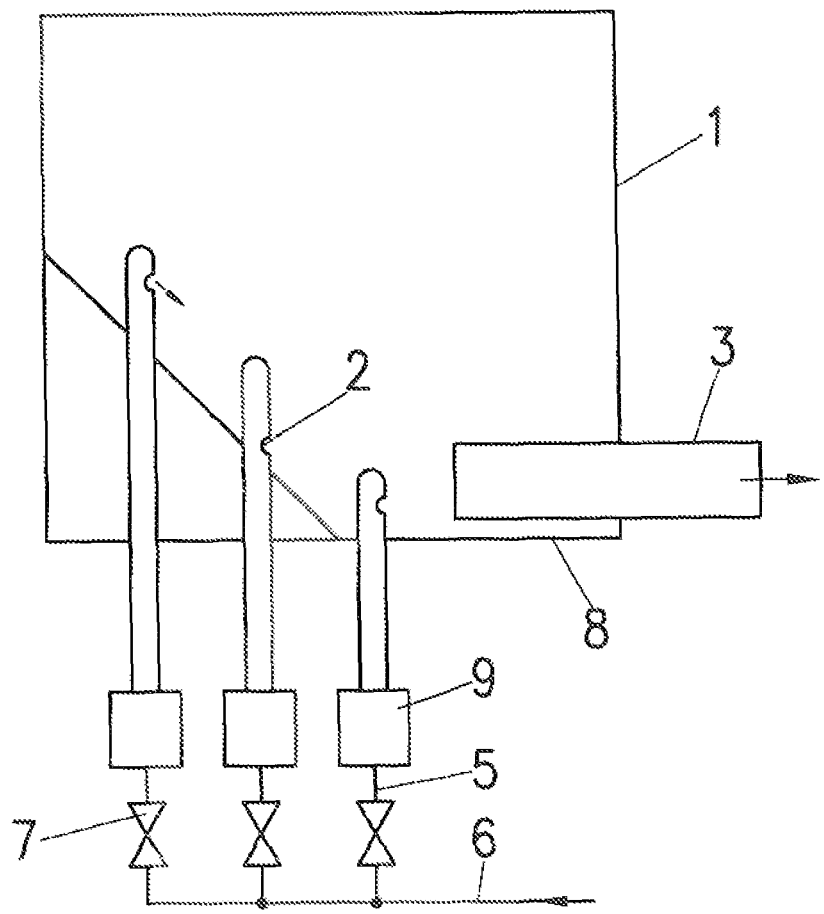

Reactor vessel 1 depicted in FIG. 3 as a longitudinal sectional view through the lower section has a square bottom 8.

Here, supply pipes 5 protrude above bottom 8, from below through reactor vessel 1. In the current example each supply pipe 5 is shown with only one inlet 2 which is arranged at such height above bottom 8 that protrudes in all events above a possible sediment deposit—which in this example is slanted—on bottom 8.

If required, supply pipes 5 may also be designed so that they are adjustable from outside the reactor. In this way the height and orientation of inlets 2 of corresponding supply pipe 5 can be changed or adapted relatively easily.

To impede sediment deposit on bottom 8 in the region of supply pipes 5, bottom 8 is generally slanted, whereby the slant is realized so that the sediment slides in the direction of a sediment drain 3 on bottom 8 of the reactor.

Moreover, all inlets 2 are directed toward this sediment drain 3. This causes the waste water fed into reactor vessel 1 through the inlets to already loosen and transport sediments in the direction of this sediment drain 3. For flushing bottom 8, individual or all inlets 2 can inject waste water at a higher than normal pressure into reactor vessel 1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A reactor for anaerobically purifying a waste water from a paper industry, said reactor comprising:
   a reactor vessel including a bottom region having a bottom;
   a plurality of inlets arranged in said bottom region of said reactor vessel to feed the waste water to be purified into the reactor;
   at least one outlet for discharging a purified water;
   at least one sediment drain;
   a plurality of supply pipes, at least one of said plurality of inlets being fed by one of said plurality of supply pipes, said plurality of inlets being arranged at a height above said bottom such that said plurality of inlets, when a sediment deposit is deposited on said bottom, extends beyond said sediment deposit which forms a slope, one of at least a majority of and all of said plurality of supply pipes protruding upwardly beyond said bottom of said reactor vessel;
   a collecting supply pipe, said plurality of supply pipes being fed by one said collecting supply pipe, at least a majority of said plurality of supply pipes of said collecting supply pipe supplying a maximum of ten of said plurality of inlets with the waste water to be purified; and
   a plurality of control valves, at least said majority of said plurality of supply pipes each respectively being equipped with one of said plurality of control valves.

2. The reactor according to claim 1, wherein at least said majority of said plurality of supply pipes of said collecting supply pipe supplies a maximum of six of said plurality of inlets with the waste water to be purified.

3. The reactor according to claim 1, wherein at least said majority of said plurality of supply pipes of said collecting supply pipe supplies a maximum of three of said plurality of inlets with the waste water to be purified.

4. The reactor according to claim 1, wherein at least said majority of said plurality of supply pipes of said collecting supply pipe respectively supplies only one of said plurality of inlets with the waste water to be purified.

5. The reactor according to claim 1, wherein all of said plurality of supply pipes are respectively equipped with one of said plurality of control valves.

6. The reactor according to claim 1, wherein one of at least said majority and all of said plurality of supply pipes are routed out of said reactor vessel.

7. The reactor according to claim 1, further including a plurality of flow meters, one of at least said majority of and all of said plurality of supply pipes being respectively equipped with one of said plurality of flow meters.

8. The reactor according to claim 1, wherein one of at least one of and all of said plurality of inlets of at least one of said plurality of supply pipes being directed to said sediment drain.

9. The reactor according to claim 1, wherein said plurality of inlets are arranged uniformly across said bottom of said reactor vessel.

10. The reactor according to claim 1, wherein said reactor vessel including at least one downward tapering funnel including a lower end, said sediment drain being located at said lower end of said funnel.

11. The reactor according to claim 10, further including at least one central supply pipe for adding a liquid, said at least one central supply pipe for adding said liquid feeding into said lower end of said funnel, a furnished said liquid including one of the waste water to be purified, a purified waste water, and a mixture thereof.

12. The reactor according to claim 1, wherein each of said plurality of inlets has a position and an orientation, one of at least some of and all of said plurality of inlets being respectively changeable in regard to at least one of said location and said orientation.

13. A method for anaerobically purifying a waste water from a paper industry, said method comprising the steps of:
   providing a reactor including a reactor vessel, a plurality of inlets arranged in a bottom region of said reactor vessel to feed the waste water to be purified into said reactor, at least one outlet for discharging a purified water, at least one sediment drain, and a plurality of control valves;
   feeding at least one of said plurality of inlets by one of a plurality of supply pipes;
   feeding said plurality of supply pipes by one collecting supply pipe;
   equipping each of said plurality of supply pipes with one of said plurality of control valves;
   opening at least individual ones of said plurality of control valves from time-to-time to a different level;
   purifying anaerobically the waste water.

14. The method according to claim 13, wherein a waste water volume supplied to all of said plurality of supply pipes is controlled through said plurality of control valves.

15. The method according to claim 13, wherein a flow rate on one of some of and all of said plurality of supply pipes is measured, and said plurality of control valves are controlled depending upon said flow rate in said plurality of supply pipes.

16. The method according to claim 13, wherein an extent of a sediment deposit on a bottom of said reactor vessel is measured.

17. The method according to claim 13, wherein, for cleaning a bottom of said reactor vessel of a plurality of sediments, said plurality of control valves supply only respective ones of said plurality of inlets, one of intensified and exclusively, with a liquid at least one of a) which are arranged in a section of said bottom which is to be flushed clean and b) which are directed onto said at least one sediment drain.

18. The method according to claim 17, wherein said liquid is the waste water to be purified.

* * * * *